US012701412B2

(12) United States Patent　　　　(10) Patent No.: US 12,701,412 B2
Gupta et al.　　　　　　　　　　　　(45) Date of Patent:　　　Aug. 4, 2026

(54) TECHNOLOGIES FOR NON-SEAMLESS WIRELESS LOCAL AREA ACCESS OFFLOAD

(71) Applicant: Apple Inc., Cupertino, CA (US)

(72) Inventors: Vivek G. Gupta, San Jose, CA (US); Haijing Hu, Los Gatos, CA (US); Shu Guo, Beijing (CN)

(73) Assignee: APPLE INC., Cupertino, CA (US)

( * ) Notice: Subject to any disclaimer, the term of this patent is extended or adjusted under 35 U.S.C. 154(b) by 542 days.

(21) Appl. No.: 18/017,842

(22) PCT Filed: Feb. 9, 2022

(86) PCT No.: PCT/CN2022/075662

§ 371 (c)(1),
(2) Date: Jan. 24, 2023

(87) PCT Pub. No.: WO2023/150931

PCT Pub. Date: Aug. 17, 2023

(65)　　　　Prior Publication Data

US 2024/0251239 A1　　　Jul. 25, 2024

(51) Int. Cl.
　　*H04W 12/06*　　　(2021.01)
　　*H04W 12/72*　　　(2021.01)
　　*H04W 84/04*　　　(2009.01)
　　*H04W 84/12*　　　(2009.01)
(52) U.S. Cl.
　　CPC ........... *H04W 12/06* (2013.01); *H04W 12/72* (2021.01); *H04W 84/042* (2013.01); *H04W 84/12* (2013.01)

(58) Field of Classification Search
CPC ... H04W 12/06; H04W 12/72; H04W 84/042; H04W 84/12; H04W 12/75; H04W 88/06; H04W 12/069; H04W 12/40; H04W 12/043

See application file for complete search history.

(56)　　　　References Cited

U.S. PATENT DOCUMENTS

| 2016/0323774 | A1 | 11/2016 | Landais et al. | |
| 2017/0134986 | A1 | 5/2017 | Jeong et al. | |
| 2021/0099869 | A1* | 4/2021 | Palanigounder | ...... H04W 12/06 |
| 2021/0112513 | A1* | 4/2021 | Chun | .................... H04W 60/00 |

(Continued)

FOREIGN PATENT DOCUMENTS

| CN | 105359564 A | 2/2016 |
| CN | 111885675 A | 11/2020 |

(Continued)

OTHER PUBLICATIONS

ETSI TS 131 102 v15.1.0 (Jul. 2018) 3GPP Technical Specification, Universal Mobile Telecommunications System (UMTS); LTE; Characteristics of the Universal Subscriber Identity Module (USIM) application, pp. 235; 262-263 (Year: 2018).*

(Continued)

*Primary Examiner* — Brandon J Miller
(74) *Attorney, Agent, or Firm* — Kilpatrick: Townsend & Stockton LLP

(57)　　　　ABSTRACT

The present application relates to devices and components including apparatuses, systems, and methods for technologies for non-seamless wireless local area access offload.

13 Claims, 12 Drawing Sheets

(56) References Cited

U.S. PATENT DOCUMENTS

2023/0044847 A1* 2/2023 Palanigounder ...... H04W 12/06

FOREIGN PATENT DOCUMENTS

WO    WO-2020095617 A1 * 5/2020    ............ H04W 8/183
WO    WO-2020249635 A1 * 12/2020    ............ H04W 8/183

OTHER PUBLICATIONS

Solution for 5G NSWO Authentication, Qualcomm Incorporated, 3GPP TSG-SA3 Meeting #104-e, S3-212870, Aug. 27, 2021, 4 pages.
International Patent Application No. PCT/CN2022/075662, International Search Report and Written Opinion, May 5, 2022, 9 pages.
3rd Generation Partnership Project; Technical Specification Group Core Network and Terminals; Access to the 3GPP 5G Core Network (5GCN) via Non-3GPP Access Networks (N3AN); Stage 3 (Release 17), 3GPP TS 24.502 V17.4.0, Sep. 2021, 95 pages.
3rd Generation Partnership Project; Technical Specification Group Core Network and Terminals; Characteristics of the Universal Subscriber Identity Module (USIM) application (Release 17), 3GPP TS 31.102 V17.4.0, Dec. 2021, 330 pages.
3rd Generation Partnership Project; Technical Specification Group Services and System Aspects; Security architecture and procedures for 5G system (Release 17), 3GPP TS 33.501 V17.4.2, Jan. 2022, 287 pages.
3rd Generation Partnership Project; Technical Specification Group Core Network and Terminals; Non-Access Stratum (NAS) configuration Management Object (MO) (Release 17), 3GPP TS 24.368 V17.1.0, Dec. 2021, 42 pages.
International Patent Application No. PCT/CN2022/075662, International Preliminary Report on Patentability, Aug. 22, 2024, 6 pages.
5G NSWO (Non-Seamless WLAN Offload) Support, 3rd Generation Partnership Project Technical Specification Group Working Group 6 Meeting #109-bis-e, C6-220079, Jan. 18-21, 2022, 10 pages.
Meeting Report v1.0.0 for Technical Specification Group CT Working Group 6 meeting: bis, 3rd Generation Partnership Project, XP052273594, Jan. 18-21, 2022, 56 pages.
Usage of AN ID for NSWO Authentication, 3rd Generation Partnership Project Technical Specification Group, SA-3, Meeting #106-e, S3-220283, Feb. 14-25, 2022, 5 pages.
European Patent Application No. 22925294.5, Extended European Search Report, Jul. 28, 2025, 10 pages.
CL202402399, "Office Action", Jan. 19, 2026, 33 pages.
KR10-2024-7025731, "Office Action", Feb. 4, 2026, 10 pages.

* cited by examiner

Figure 3:
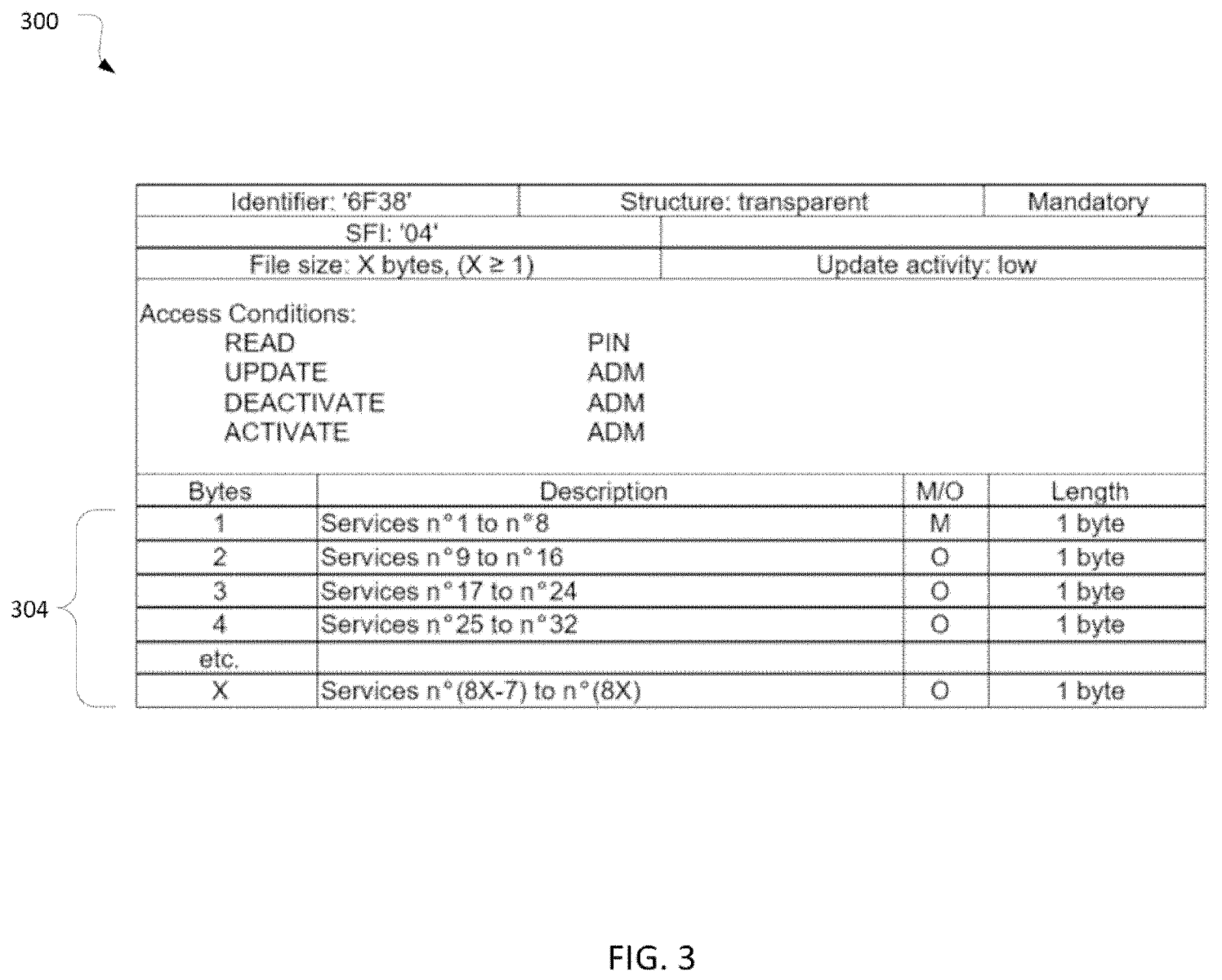

300

| Identifier: '6F38' | | Structure: transparent | | Mandatory |
|---|---|---|---|---|
| SFI: '04' | | | | |
| File size: X bytes, (X ≥ 1) | | Update activity: low | | |
| Access Conditions: | | | | |
| READ | PIN | | | |
| UPDATE | ADM | | | |
| DEACTIVATE | ADM | | | |
| ACTIVATE | ADM | | | |

| Bytes | Description | M/O | Length |
|---|---|---|---|
| 1 | Services n°1 to n°8 | M | 1 byte |
| 2 | Services n°9 to n°16 | O | 1 byte |
| 3 | Services n°17 to n°24 | O | 1 byte |
| 4 | Services n°25 to n°32 | O | 1 byte |
| etc. | | | |
| X | Services n°(8X-7) to n°(8X) | O | 1 byte |

| Identifier: '4F02' | | Structure: transparent | | Optional |
|---|---|---|---|---|
| | SFI: '02' | | | |
| File size: 20 bytes | | | Update activity: high | |
| Access Conditions: | | | | |
| READ | | PIN | | |
| UPDATE | | PIN | | |
| DEACTIVATE | | ADM | | |
| ACTIVATE | | ADM | | |

| Bytes | Description | M/O | Length |
|---|---|---|---|
| 1 to 13 | 5G-GUTI for non-3GPP access | M | 13 bytes |
| 14 to 19 | Last visited registered TAI in 5GS for non-3GPP access | M | 6 bytes |
| 20 | 5GS update status for non-3GPP access | M | 1 byte |
| 21 | HPLMN Supports NSWO | O/M | 1 byte |

FIG. 4

| Identifier: '4F04' | | | Structure: linear fixed | | | Optional |
|---|---|---|---|---|---|---|
| SFI: '04' | | | | | | |
| Record size: X bytes (X≥57) | | | | | Update activity: high | |
| Access Conditions: | | | | | | |
| READ | | | PIN | | | |
| UPDATE | | | PIN | | | |
| DEACTIVATE | | | ADM | | | |
| ACTIVATE | | | ADM | | | |
| Bytes | Description | | | | M/O | Length |
| 1 to X | 5GS NAS Security Context TLV Object | | | | M | X bytes |
| X+1 | HPLMN supports NSWO | | | | O/M | 1 byte |

Accessing parameter of ME or
UICC configuration
804

Determining HPLMN supports 5GS
NSWO based on parameter
808

Generating and transmitting EAP
identity response message with
SUCI in NAI format based on
HPLMN supporting 5GS NSWO
812

900

Storing a file with a parameter to indicate the HPLMN supports 5GS NSWO
904

Receiving one or more requests
908

Transmitting the parameter and a SUCI based on the one or more requests
912

Generating a NAS configuration MO with a parameter to indicate the HPLMN supports 5GS NSWO
1004

Transmitting the NAS configuration MO to a UE
1008

TECHNOLOGIES FOR NON-SEAMLESS WIRELESS LOCAL AREA ACCESS OFFLOAD

CROSS-REFERENCE TO RELATED APPLICATION

This application is a 371 U.S. National Phase of PCT International Patent Application No. PCT/CN2022/075662, filed Feb. 9, 2022, which is herein incorporated by reference in its entirety for all purposes.

BACKGROUND

Third Generation Partnership Project (3GPP) Technical Specifications (TSs) define standards for New Radio (NR) wireless networks. One area of study for developing these TSs is managing non-seamless wireless local area network offload (NSWO).

BRIEF DESCRIPTION OF THE DRAWINGS

FIG. 3 illustrates an elementary file in accordance with some embodiments.

FIG. 4 illustrates another elementary file in accordance with some embodiments.

FIG. 5 illustrates another elementary file in accordance with some embodiments.

DETAILED DESCRIPTION

Figure 1:
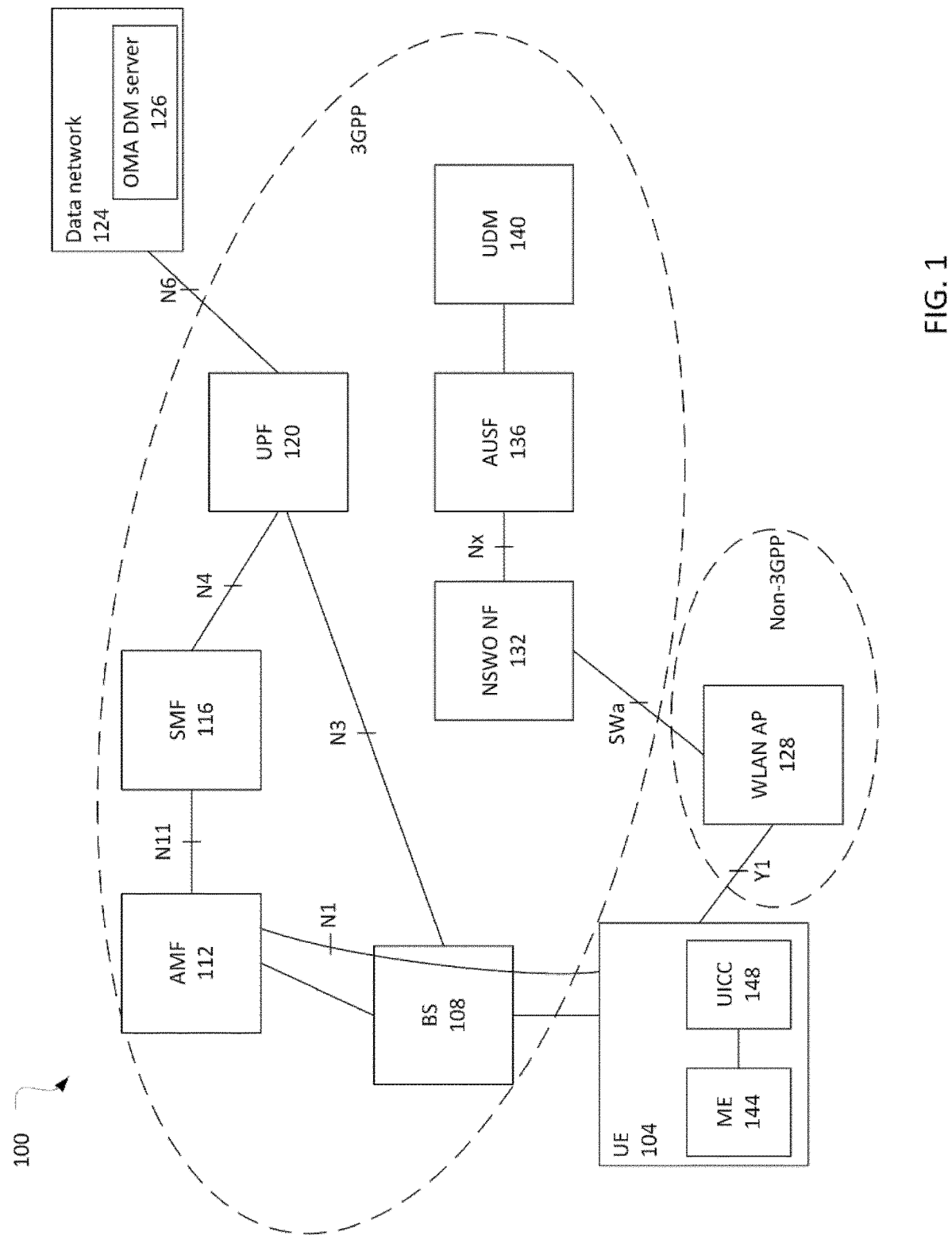
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B).

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, or network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation." and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a user equipment (UE) 104, components of a Third Generation Partnership Project (3GPP) domain, and components of a non-3GPP domain. The components of the 3GPP domain may include a Fifth Generation (5G) access network, represented by base station 108, and a 5G core (5GC) that includes an access and mobility function (AMF) 112, a session management function (SMF) 116, and a user plane function (UPF) 120 coupled with a data network 124, which may include an open mobile alliance (OMA) data management (DM) server 126. A Fifth Generation System (5GS) may include both the 5G access network and the 5GC.

The UE 104 and the base station 108 may communicate over air interfaces compatible with 3GPP TSs such as those that define 5GS standards. The base station 108 may be a gNB to provide one or more 5G New Radio (NR) cells that present NR user plane and control plane protocol terminations toward the UE 104.

The UE 104 may include mobile equipment (ME) 144 coupled with a universal integrated circuit card (UICC) 148. The ME 144 may represent the fixed components of the UE 104 while the UICC 148 may be an auxiliary component, which may be removable, that is used to ensure the integrity and security of personal data. The ME 144 may correspond to the device of FIG. 11. The UICC 148, which may also be referred to as a subscriber identity module (SIM) card or a smart card, may include processing circuitry (for example, a central processing unit (CPU)), memory circuitry (for example, read-only memory, random access memory, or electrically erasable programmable read only memory (EE-PROM)) and input/output (I/O) circuitry. The I/O circuitry of the UICC 148 may couple with driver or other I/O circuitry of the ME 144.

The UICC 148 may implement a universal subscriber identity module (USIM) to perform various user authentication and identity operations, some of which are described in further detail herein.

The AMF 112 may be responsible for registration management (e.g., for registering UE 104, etc., connection management, reachability management, mobility management, lawful interception of AMF-related events, and access authentication and authorization. The AMF 112 may be coupled with the UE 104 via an N1 interface and may be coupled with the SMF 116 via an N11 interface.

The SMF 116 may configure traffic steering, quality of service (QoS) control and policy related functions at the UPF 120, perform protocol data unit (PDU) session management, Internet protocol (IP) address allocation, general packet radio service tunneling protocol-user plane (GTP-U) tunnel management, selection and control of user plane functions, and downlink notification management. The SMF 116 may be coupled with the UPF 120 via an N4 interface.

The UPF 120 may handle the user plane path of PDU sessions to facilitate routing of traffic to and from the data network 124. The UPF 120 may be coupled with the data network 124 via an N6 interface and with the base station 108 via an N3 interface.

Embodiments of the present disclosure provide for NSWO by allowing the UE 104 to offload selected traffic to a non-3GPP access network, for example, a wireless local area network (WLAN) represented by WLAN access point 128. This may be done by the UE 104 connecting to the WLAN AP 128, via a Y1 interface, using subscriber identity module (SIM)-based access authentication via components of the 5GC. In this manner, the UE 104 may connect to a WLAN venue such as a hotel or stadium using SIM-based access authentication. This may allow the use of a mobile network subscription and roaming agreements for WLAN access and for offloading selected traffic to the WLAN. The traffic selected for offloading may be based on various policies.

The components of the 5GC used to authenticate the UE 104 for NSWO include a NSWO network function (NF) 132, an authentication server function (AUSF) 136, and a unified data management (UDM) 140.

The NSWO NF 132 may be used to isolate the AUSF 136 from the WLAN access network. The NSWO NF 132 may be coupled with the WLAN AP 128 using a SWa reference point and to the AUSF 136 using an Nx interface that is a service-based interface (SBI).

The AUSF 136 may operate as a control plane function that supports subscriber and network authentication. For example, the AUSF 136 may verify that the UE 104 is an authorized subscriber and may also allow the UE 104 to verify the 5GS.

The UDM 140 may be a control plane function that manages and stores subscriber data.

5GS may support two methods for mutual authentication between the UE 104 and the network; an extensible authentication protocol (EAP)-based method and a 5G authentication key agreement (AKA)-based method. The EAP-based method may be an EAP-AKA prime (EAP-AKA') method as defined in Internet Engineering Task Force (IETF) Request for Comments (RFC) 5448, for example, or an EAP-transport layer security (TLS) method. 5GS supports a unified authentication framework that supports more use cases than the 4$^{th}$ Generation System (4GS). EAP-TLS may be used for non-SIM credentials.

In Evolved Packet Service (EPS) networks, a UE sends its permanent identifier (for example, international mobility subscriber identifier (IMSI)) in clear text to the network. This exposes the identity to the possibility of being stolen by either a malicious network (for example, a fake base station) or a passive adversary over the radio links if the links are not properly protected. To address this vulnerability, 5GS provides for the UE 104 to use a public-key of a home network to encrypt its subscription permanent identifier (SUPI) as a subscription concealed identifier (SUCI) before it is sent to the 5G network. This increases user equipment identity protection in 5GS as an international mobile subscriber identity (IMSI) is never sent in the clear.

In order to support NSWO for users with credentials defined in a 5GC, the NSWO authentication procedure may make use of the credentials provided by components of the 5GC including, for example, an authentication credential repository and processing function (ARPF) of the UDM 140. To ensure the NSWO authentication procedures support the same or a similar level of security and privacy as 5GS and do not expose the IMSI/SUPI in the clear, embodiments describe use of the EAP-AKA' authentication method using 5GC credentials for NSWO. The EAP-AKA' authentication method is carried out between the UE 104, NSWO NF 132, AUSF 136, and the UDM 140 and is described in further detail with respect to FIG. 6.

Various embodiments describe details on the authentication procedure to be used for 5G NSWO. In particular, some embodiments describe how the authentication for 5G NSWO is to be supported; the format of the SUCI used for the NSWO authentication process; the ME and UICC configurations for handling 5G NSWO for HPLMN; impacts to AUSF to support the EAP-AKA' authentication method; and the impacts to UDM to retrieve authentication information for the EAP-AKA' authentication method.

In the event a HPLMN both supports 5G NSWO and wants the UE 104 to use NSWO, it may configure the UE 104 through a configuration of the ME 144 using, for example, a non-access stratum (NAS) configuration management object (MO), or a configuration of the UICC 148. If both the UICC and ME configurations are included, then the UICC configuration may be provided precedence over the ME configuration. In some embodiments, if the UE 104 supports 5G NSWO and is configured to use it, the UE 104 will use 5G NSWO and not use EPS NSWO as defined in 3GPP TS 23.402 v17.0.0 (2021 Mar. 30). FIGS. 2-5 describe various aspects of the ME and UICC configurations in more detail.

Embodiments of the present disclosure enable the UE 104 to perform NSWO for 3GPP access while taking HPLMN preferences into account and without significant impacts to the 5GC. Some embodiments may be implemented with no changes in the UICC 148 and only changes in the ME 144. Other embodiments may be implemented with changes in the UICC 148.

Figure 2:
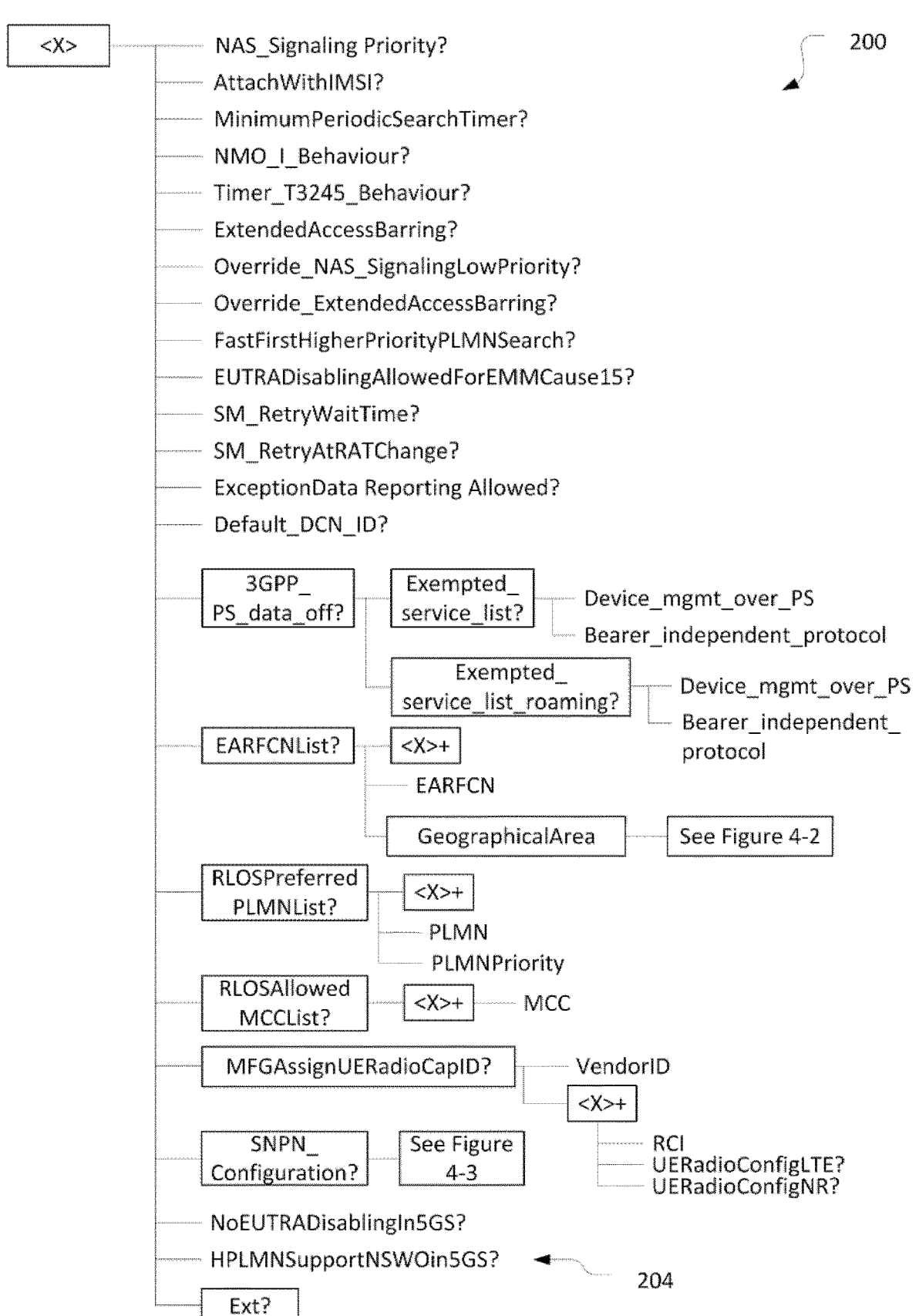
FIG. 2 illustrates a non-access stratum configuration management object in accordance with some embodiments.

FIG. 2 illustrates a NAS configuration MO 200 that may be used for an ME configuration in accordance with some embodiments. The NAS configuration MO 200 may be used to manage configuration parameters related to NAS functionality. Except as otherwise described herein, the NAS configuration MO 200 may be similar to a NAS configuration MO as described in clause 4 of 3GPP TS 24.368 v17.1.0 (2021-12). The parameters of the NAS configuration MO 200 may be similar to like-named parameters described in clause 5 of 3GPP TS 24.368.

In addition to the parameters described in clause 5 of 3GPP TS 24.368, the NAS configuration MO 200 may include a NSWO parameter (HPLMSupportNSWOin5GS) 204. The NSWO parameter 204 may be a leaf of the NAS configuration MO 200 that indicates whether the HPLMN supports non-seamless WLAN offload in 5GS and wants the UE to use it or not.

The NSWO parameter 204 may be a one bit value that indicates whether the NSWO in 5GS is enabled or disabled. In some embodiments, the NSWO parameter 204 may have the following properties:

Occurrence: ZeroOrOne
  Format: bool
  Access Types: Get, Replace
  Values: 0, 1
    0 to indicate that use of NSWO in 5GS is disabled, see, for example, 3GPP TS 24.502 v17.4.0 (2021 Jan. 9)
    1 to indicate that use of NSWO in 5GS is enabled, see, for example, 3GPP TS 24.502 v17.4.0 (2021 Jan. 9)
    Default value of 0 is to be applied if this leaf is not provisioned.

In other embodiments, the NSWO parameter 204 may be a two-bit value to provide a first indication of whether the HPLMN supports NSWO in 5GS and a second indication of whether the UE is to use NSWO in 5GS.

In some embodiments, the OMA DM server 126 may provide the NAS configuration MO 200 to the ME 144 using, for example, the OMA DM protocol.

The UICC configuration may be used to indicate whether the HPLMN both supports 5G NSWO and wants the UE 104 to use NSWO according to one or more of the following options.

In a first option, the UICC configuration may be provided by including an NSWO parameter in a USIM service table elementary file (EF_UST). FIG. 3 illustrates an EF_UST 300 in accordance with some embodiments. Except as otherwise described herein, the EF_UST 300 may be similar to an EF_UST as described in clause 4.2.8 of 3GPP TS 31.102 v17.4.0 (2021 December).

The EF_UST 300 may be stored in the USIM of the UICC 148 and may indicate which services are available. The ME 144 may access the EF_UST to identify the available services. If the service is not indicated as available in the USIM, the ME 144 shall not select the service.

The list of services that are available may be provided in service contents 304. The service contents 304 may include at least one byte to provide an indication for corresponding services. Thus, byte 1 is shown as mandatory with the remaining bytes shown as optional. If the service contents 304 include an optional byte, then it may be mandatory for the service contents 304 to include all bytes before that byte.

The service contents 304 may identify available services from the list of services provided in clause 4.2.8 of 3GPP TS 31.102. Additionally, in some embodiments, the service contents 304 may include an indication that a 5G NSWO support service is available, his may be generically represented as "Service no xxx—5G NSWO support" as provided in Byte X of the service contents 304.

In addition to updating clause 4.2.8 of 3GPP TS 31.102 to account for the 5G NSWO support service, clause 4.4.11 of 3GPP TS 31.102 may be updated to reflect the NSWO content of files at the 5GS dedicated file (DF_5GS) level. The DF_5GS provides for services that are specific for 5GS. The DF_5GS shall be present at the USIM application DF (ADF_USIM) level if any of the 5GS services listed in clause 4.4.11.1 of 3GPP TS 31.102 are "available" in the EF_UST. The listed services in clause 4.4.11.1 of 3GPP TS 31.102 may be updated to include Service n°xxx—5G NSWO support. The USIM application dedicated files may contain service and network related information that may allow an ME to look for relevant information (for example, the NSWO support parameter) in the appropriate place.

Additional clauses of 3GPP TS 31.102 may be added/updated to provide for the 5G NSWO procedure. For example, a clause, generically referred to as clause 5.3.xx 5G NSWO procedure, may be added with the following:

Requirement: Service n°xxx is "available"

If Non-seamless WLAN offload (NSWO) is supported by the ME, the ME shall follow the authentication procedure for NSWO in 5GS (5G NSWO) as defined in TS 33.501 v17.4.2 (2022 Jan. 26) Annex S.

In a second option, the UICC configuration may be provided by including an NSWO parameter in a 5GS non-3GPP location information EF (EF_5GSN3GPPLOCI). FIG. 4 illustrates an EF_5GSN3GPPLOCI 400 in accordance with some embodiments. Except as otherwise described herein, the EF_5GSN3GPPLOCI 400 may be similar to an EF_5GSN3GPPLOCI as described in clause 4.4.11.3 of 3GPP TS 31.102.

If the service no 122 (5GS mobility management information) is "available" in the EF_UST, the EF_5GSN3GPPLOCI 400 is to be present. The EF_5GSN3GPPLOCI 400 may include 5GS location information for non-3GPP access. In addition to the information described in clause 4.4.11.3 of 3GPP TS 31.102, the EF_5GSN3GPPLOCI 400 may additionally/alternatively include the HPLM-supports-NSWO parameter 404 to indicate whether the HPLMN supports non-seamless WLAN offload in 5GS and wants the UE 104 to use it or not. The HPLM-supports-NSWO parameter 404 may be one byte, shown as byte 21 in the EF_5GSN3GPPLOCI 400, which may be optional or mandatory.

In a third option, the UICC configuration may be provided by including an NSWO parameter in a 5GS non-3GPP access NAS security context EF (EF_5GSN3GPPNSC). FIG. 5 illustrates an EF_5GSN3GPPNSC 500 in accordance with some embodiments. Except as otherwise described herein, the EF_5GSN3GPPNSC 500 may be similar to an EF_5GSN3GPPNSC as described in clause 4.4.11.5 of 3GPP TS 31.102.

If the service n° 122 (5GS mobility management information) is "available" in the EF_UST, the EF_5GSN3GPPNSC 500 is to be present. The EF_5GSN3GPPNSC 500 may include 5GS non-3GPP access NAS security context information. In addition to the information described in clause 4.4.11.5 of 3GPP TS 31.102, the EF_5GSN3GPPNSC 500 may additionally/alternatively include the HPLM-supports-NSWO parameter 504 to indicate whether the HPLMN supports non-seamless WLAN offload in 5GS and wants the UE 104 to use it or not. The HPLM-supports-NSWO parameter 504 may be one byte, shown as byte X+1 in the EF_5GSN3GPPNSC 500, which may be optional or mandatory.

Figure 6:
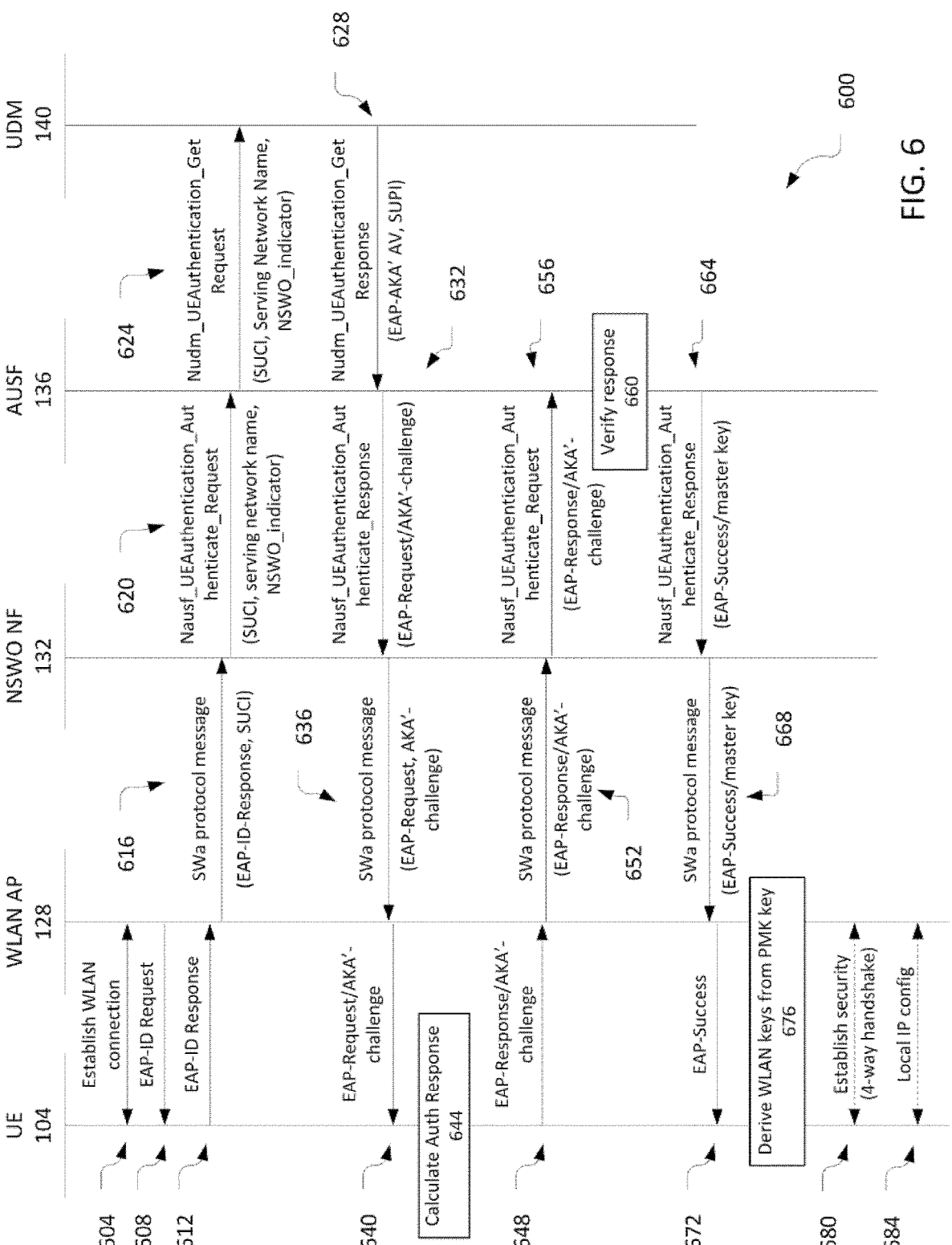
FIG. 6 illustrates an authentication procedure in accordance with some embodiments.

FIG. 6 illustrates an authentication procedure 600 in accordance with some embodiments. The authentication procedure 600 may be an EAP-AKA' authentication among the UE 104, the WLAN AP 128, NSWO NF 132, AUSF 136, and UDM 140 to support 5GS NSWO. Except as otherwise described herein, the authentication procedure 600 may be similar to that described in Annex S of 3GPP TS 33.501.

The authentication procedure 600 may begin at 604 by the UE 104 establishing a WLAN connection with the WLAN AP 128. The WLAN connection may be a link layer connection established by the UE 104 in order to perform NSWO via the WLAN access. The WLAN connection may be established based on IEEE 802.11-2016 specifications.

At 608, the WLAN AP 128 may send an EAP-ID request to the UE 104.

Upon receiving the EAP-ID request, the UE 104 may construct an EAP-ID response, which may be sent to the WLAN AP 128 at 612. The UE 104 may construct the EAP-ID response to include a SUCI in a network access identifier (NAI)-format from the IMSI that is stored in the UICC 148. Constructing the SUCI in NAI format when the SUPI stored in the UICC 148 is IMSI may be performed as follows.

The ME 144 may retrieve the SUCI from the USIM of the UICC 148 using a GET IDENTITY command. If the SUPI format type is IMSI and the SUCI needs to be in the NAI format, the ME 144 may only need to add the realm part to the retrieved SUCI to generate the SUCI in the NAI format. The ME 144 may construct the SUCI retrieved from the USIM in NAI format as defined in 3GPP TS 23.003.

The ME 144 may add the realm part to the SUCI using a home network identifier obtained from the IMSI. The home network identifier may include a mobile country code (MCC) and a mobile network code (MNC) of the IMSI. The realm part of the NAI may be, for example, '@5gc.mnc<MNC>.mcc<MCC>0.3gppnetwork.org.'

Thus, for the EAP response message, the UE 104 may use the SUCI in the NAI format (for example, "username@realm format") as its identity irrespective of whether the SUPI type configured on the USIM is IMSI or NA. If the SUPI type is configured on the USIM is IMSI, the UE 104 may construct the SUCI in NAI format with the username containing the encrypted mobile subscriber identification number (MSIN) and the realm part containing the MCC/MNC.

Figure 7:
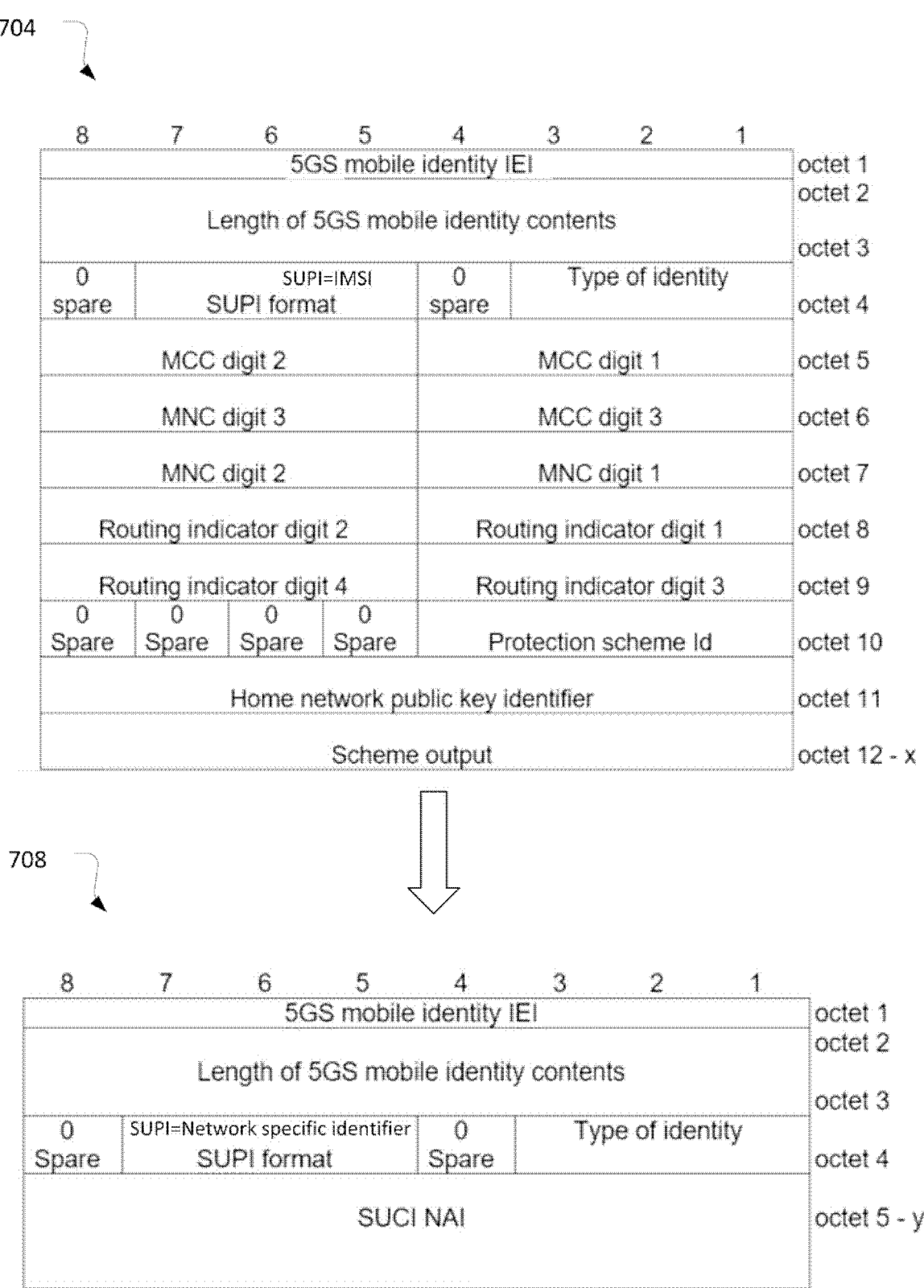
FIG. 7 illustrates information elements in accordance with some embodiments.

FIG. 7 illustrates information elements (IE) 704 and 708 in accordance with some embodiments. The IE 704 may be a 5GS mobile identity IE for type of identity "SUCI" and SUPI format "IMSI." The IE 708 may represent a 5GS mobile identity TE for type of identity "SUCI" and SUPI format "Network specific identifier." Except as otherwise described herein, IEs 704 and 708 may be respectively similar to FIGS. 9.11.3.4.3 and 9.11.3.4.4 of 3GPP TS 24.501 v7.5.0 (2022 Jan. 5) and associated descriptions.

The IE 704 may represent information provided to the ME 144 by the UTCC 148 in response to a GET IDENTITY command. The ME 144 may convert the IE 704 to the IE 708 as described above. The ME 144 may then include the IE

708 in the EAP-1D response transmitted to the WLAN AP 128 as part of the authentication procedure 600.

Figure 9:
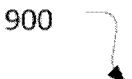
FIG. 9 illustrates another operational flow/algorithmic structure in accordance with some embodiments.
Figure 9:
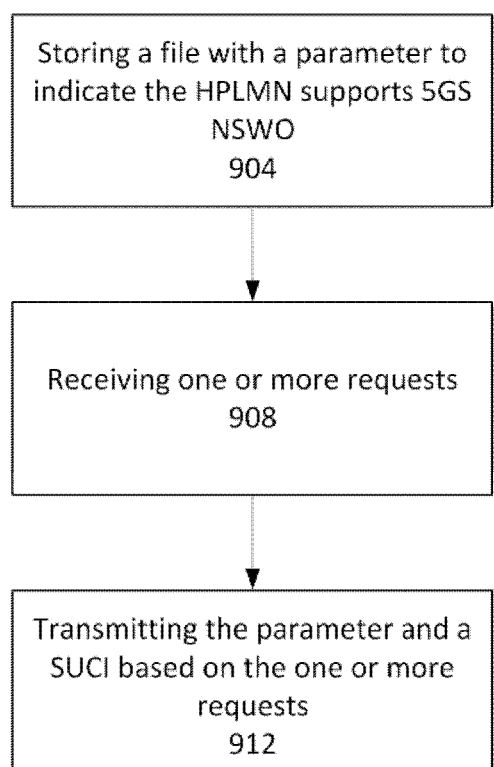

To account for the use and conversion of the IEs discussed above, the text of 3GPP TS 24.501 and 3GPP TS 24.502 may be updated. For example, 3GPP TS 24.501 may be updated to include the following text: "FIG. 9.11.3.4.3 represents the mobile identity when type of identity is SUCI and SUPI format is IMSI in UICC. The ME converts this mobile identity from SUPI format=IMSI to SUPI format=Network specific identifier as shown in FIG. 9.11.3.4.4 when data is sent over non-3GPP access network (for NSWO)."

3GPP TS 24.502 may be updated to include section 6.3.X as follows:

6.3.X Authentication and Authorization Via Non-3GPP Access Network for NSWO

In order to perform NSWO via a WLAN access, the UE establishes a link layer connection to the WLAN access network which then initiates authentication and authorization for NSWO. Since UE wants to use 5GC credentials, 5GC selects EAP-AKA' authentication method for NSWO.

Upon reception of EAP-Request/Identity message, the UE shall:

a) construct an EAP-Response/Identity message as described in IETF RFC 3748 (June 2004) containing an NAI username@realm as specified in IETF RFC 7542 (May 2015); When SUPI type in USIM is IMSI and SUCI needs to be in NAI format, the ME retrieves the current SUCI from USIM using the GET IDENTITY command as specified in TS 31.102 and constructs the SUCI in NAI format to be used for authentication and authorization as follows. The returned SUCI from UICC consists of the concatenation of the following information as described in 3GPP TS 23.003 v17.4.0 (2021 Dec. 16);

SUPI type, ii) Home network identifier (i.e. MCC and MNC when SUPI Type is IMSI or domain name when SUPI Type is Network Specific Identifier, Global Line Identifier or Global Cable Identifier), iii) Routing indicator, iv) Protection scheme identifier v) Scheme output, resulting from the protection scheme profile, identified by the protection scheme identifier. The protection scheme profile shall be one of those defined in Annex C of 3GPP TS 33.501 or one of those specified by the Home network b) for 5G NSWO case, since the Home network identifier with MCC and MNC is in clear ME can construct the SUCI in the NAI format as follows:

SUPI type, ii) Routing indicator, iii) Protection scheme identifier iv) Home network public key identifier v) Scheme output, resulting from the protection scheme profile, identified by the protection scheme identifier. The protection scheme profile shall be one of those defined in Annex C of 3GPP TS 33.501 or one of those specified by the Home network and vi) Realm part of the NAI '@5gc.mnc<MNC>.mcc<MCC>0.3gppnetwork.org' (Home network identifier (i.e. MCC and MNC) received from USIM shall be used to construct the realm part in the NAI format); and c) transmit the EAP-Response of identity type encapsulated in the link layer protocol packets towards the NSWO NF.

As an example:

Assuming the IMSI 234150999999999, where MCC=234, MNC=15 and MSISN=0999999999, the Routing Indicator 678, and a Home Network Public Key Identifier of 27, the NAI format for the SUCI takes the form (for the Profile <A> protection scheme) as: type0.rid678.schid1.hnkey27.ecckey<ECC ephemeral public key>.cip<encryption of 0999999999>.mac<MAC tag value>@v5gc.mnc015.mcc234.3gppnetwork.org.

At 616, the WLAN AP may transmit a SWa protocol message to the NSWO NF 132 based on the realm part of the SUCI. The SWa protocol message may include the EAP-ID response and the SUCI received from the UE 104.

At 620, the NSWO NF 132 may send an authentication-request message (for example, Nausf_UEAuthentication_Authenticate_request message) to the AUSF 136. The authentication-request message may trigger an authenticate service operation that permits NSWO NF 132 to initiate authentication of the UE 104. The authentication-request message may provide the AUSF 136 with the following information: the SUCI, the serving network name, and an NSWO indicator. The NSWO indicator may convey the information to the AUSF 136 that this authentication procedure is triggered for NSWO purposes. The serving network name may be set to "5G:NSWO."

In this context, the AUSF 136 may be acting as an NF service producer to provide the UE authentication services (for example, Nausf_UEAuthentication service) to the NSWO NF 132, which may be acting as the NF service consumer. The UE authentication service is to authenticate the UE and provide one or more master keys that may be used by the NSWO NF 132 to derive subsequent keys.

Updates to the text of 3GPP TS 29.509 v17.4.0 (2021 Dec. 17) may be provided to accommodate the NSWO indicator in the UE authentication services. For example, clause 5.2.2.2.1 may be updated to reflect that, to provide authentication services, the AUSF may receive an NSWO indicator in addition to a UE ID (for example, SUPI or SUCI) and the serving network name.

The Nausf_UEAuthentication services provided by the AUSF 136 may be similar to that described in clause 5.2 of 3GPP TS 29.509, and a Nausf_UEAuthentication Service application programming interface (API) may be similar to that described in clause 6.1 of 3GPP TS 29.509.

At 624, the AUSF 136 may send an authentication get-request message (for example, an Nudm_UEAuthentication_GetRequest message) to the UDM 140. The authentication get-request message, which may include the SUCI, the serving network name, and the NSWO indicator, may be used by the AUSF 436 to retrieve the UE's subscribed authentication method from the UDM 140.

Upon receiving the authentication get-request message, the UDM 140 may use a subscription identifier de-concealing function (SIDF) to de-conceal the SUPI from the SUCI.

The Nudm_UEAuthentication services provided by the UDM 140 may be similar to that described in clause 5.4 of 3GPP TS 29.503, and a Nudm_UEAuthentication Service API may be similar to that described in clause 6.3 of 3GPP TS 29.503 v17.5.0 (2021 Dec. 17).

At 628, the UDM 140 may respond with an authentication get-response message (for example, Nudm_UEAuthentication GetResponse message) to the AUSF 136. The authentication get-response message may include an EAP-AKA' authentication vector (AV) and a SUPI. The EAP-AKA' AV may include a random part (RAND), an authenticator part (AUTN), an expected result part (XRES), a session key for integrity check (IK'), and a session key for encryption (CK').

Depending on the information provided by the UDM 140 in the authentication get-response message, the AUSF 136 may enter a 5G-AKA procedure or an EAP-based authentication' procedure. As described above, when authenticating the UE 104 for 5G NSWO purposes, the AUSF 136 may select the EAP-based authentication (for example, EAP-AKA') and may generate a resource accordingly. In particular, the AUSF 136 may generate an AKA' challenge.

At 632, the AUSF 136 may transmit an authentication response message (for example, Nausf_UEAuthentication_Authenticate_Response) to the NSWO NF 132. The authentication response message may include an EAP request and the AKA' challenge.

In order to accommodate the selection of the EAP-based authentication for 5GS NSWO authentication services, updates to the text of 3GPP TS 29.509 may be provided for operations related to the Nausf service based interface (between NSWO NF 132 and the AUSF 136) and updates to the text of 3GPP TS 29.503 may be provided for operations related to the Nudm service based interface (between the AUSF 136 and the UDM 140).

For example, clause 5.2.2.2.1 of 3GPP TS 29.509 may be updated to reflect that, when NSWO indicator is included (in messages 620 and 624, for example), the UDM is to select EAP-based authentication (EAP-AKA').

Various other tables in 3GPP TS 29.509 may be updated to accommodate UE authentication for 5GS NSWO as follows.

Table 6.1.3.1-1 may be updated to account for the selection of EAP AKA' based on presence of the NSWO indicator as shown in Table 1 below.

TABLE 1

| Resource name (Archetype) | Resource URI | HTTP method or custom operation | Description |
| --- | --- | --- | --- |
| ue-authentications (Collection) | /ue-authentications | POST | Initiate the authentication process by providing inputs related to the UE. If NSWO_indicator is included, EAP AKA' is selected as authentication method. |
| | /ue-authentications/ deregister | deregister (POST) | Clear the security context of the UE |

Table 6.1.3.2.3.1-2 of 3GPP TS 29.509, which defines data structures supported by the POST request body on a resource, may be updated to account for the presence of the NSWO indicator in the Authentication information as shown in Table 2 below.

TABLE 2

| Data type | P | Cardinality | Description |
| --- | --- | --- | --- |
| AuthenticationInfo | M | 1 | Contains the UE id (i.e. SUCI or SUPI as specified in 3GPP TS 33.501), NSWO indicator, and the serving network name. It may also contain Trace Data as specified in 3GPP TS 23.501. |

The authentication information may be included in the authentication-request message transmitted at 620, for example.

Table 6.1.6.1-1 of 3GPP TS 29.509, which defines Nausf specific data types, may be updated to account for the presence of the NSWO indicator in the Authentication information as shown in Table 3 below.

TABLE 3

| Data type | Clause defined | Description |
| --- | --- | --- |
| AuthenticationInfo | 6.1.6.2.2 | Contains the UE id (i.e. SUCI or SUPI), NSWO indicator, and the Serving Network Name. |

Table 6.1.6.2.2 of 3GPP TS 29.509, which provides the definition of type AuthenticationInfo, may be updated to account for the presence of the NSWO indicator in the Authentication information as shown in Table 4 below.

TABLE 4

| Attribute name | Data type | P | Cardinality | Description |
| --- | --- | --- | --- | --- |
| | | | . . . | |
| nswoIndicator | boolean | O | 0 . . . 1 | Indicates whether authentication request is for NSWO operation |

For the updates to the Nudm service based interface, clause 5.4.2.2.2 of 3GPP TS 29.503, which describes authentication information retrieval, may be updated to recite that FIG. 5.4.2.2.2-1 shows a scenario where the NF service consumer (AUSF) retrieves authentication information for the UE from the UDM (see also 3GPP TS 33.501 clause 6.1.2). The request contains the UE's identity (supi or suci), the serving name, NSWO_indicator which is used to indicate that the authentication request is for Non-seamless WLAN offload purposes, and may contain resynchronization info.

Various other tables in 3GPP TS 29.503 may be updated to accommodate UE authentication for 5GS NSWO as follows.

Table 6.3.3.1-1 may be updated to account for the selection of EAP AKA' based on presence of the NSWO indicator as shown in Table 5 below.

TABLE 5

| Resource name (Archetype) | Resource URI | HTTP method or custom operation | Description |
| --- | --- | --- | --- |
| SecurityInformation (Custom operation) | /{supiOrSuci}/ security-information/ generate-auth-data | generate-auth-data (POST) | If the variable {supiOrSuci} takes the value of a SUCI, the UDM calculates the corresponding SUPI. The UDM calculates a fresh authentication vector based on the received information and the stored security information for the SUPI if 5G-AKA or EAP-AKA' is selected. Otherwise, UDM provides corresponding |

TABLE 5-continued

| Resource name (Archetype) | Resource URI | HTTP method or custom operation | Description |
|---|---|---|---|
| | | | authentication information. If NSWO_indicator is included EAP AKA' is selected as authentication method. |
| | | | . . . |

Clause 6.3.3.2.4.2.1 of 3GPP TS 29.503, which provides a description of the security information resource, may also be updated to account for the selection of EAP-AKA' when the NSWO indicator is included as follows:

This custom operation is used by the NF service consumer (AUSF) to request authentication information data for the SUPI/SUCI from the UDM. If SUCI is provided, the UDM calculates the SUPI from the SUCI (see 3GPP TS 33.501). The UDM calculates an authentication vector taking into account the information received from the NF service consumer (AUSF) and the current representation of this resource if 5G AKA or EAP-AKA' is selected. When NSWO_Indicator is included EAP-AKA' is selected. For details see 3GPP TS 33.501.

Table 6.3.3.2.4.2.2-1, which provides data structures supported by the POST request body on a resource, may be updated to account for the presence of the NSWO indicator in the authentication information request as shown in Table 6 below.

TABLE 6

| Data type | P | Cardinality | Description |
|---|---|---|---|
| AuthenticationInfo Request | M | 1 | Contains the serving network name, NSWO indicator, and Resynchronization Information |

The authentication information request may be included in the authentication get-request message transmitted at 624, for example.

Table 6.3.6.1-1, which provides Nudm_UEAU specific data types, may also be updated to account for the presence of the NSWO indicator in the authentication information request as shown in Table 7 below.

TABLE 7

| Data type | Clause defined | Description |
|---|---|---|
| AuthenticationInfo Request | 6.3.6.2.2 | Contains Serving Network Name, NSWO indicator, and Resynchronization Information |

Table 6.3.6.2.2-1, which provides a definition of type AuthenticationInfoRequest, may also be updated to account for the presence of the NSWO indicator in the authentication information request as shown in Table 8 below.

TABLE 8

| Attribute name | Data type | P | Cardinality | Description |
|---|---|---|---|---|
| | | | . . . | |
| nswoIndicator | boolean | 0 | 0 . . . 1 | Indicates whether authentication request is for NSWO operation |

At 636, the NSWO NF 132 may transmit a SWa protocol message, with the EAP-request and the AKA' challenge, to the WLAN AP 128. The WLAN AP 128 may forward the EAP-request and the AKA' challenge to the UE 104 at 640.

At 644, the UE 104 may calculate the authentication response. For example, the ME 144 may construct the serving network name by setting it to "5G:NSWO," and the USIM may verify the AV' by determining whether the AUTN can be accepted. If the AUTN can be accepted, the USIM may compute a response (RES) that is provide to the ME 144 with the CK and IK. The ME 144 may then derive the CK' and the IK' and use those parameters to derive a master session key (MSK).

At 648, the UE transmit an EAP response/AKA' challenge to the WLAN AP 128.

At 652, the WLAP AP 128 may transmit a SWa protocol message, including the EAP-response and the AKA' challenge, to the NSWO NF 132.

At 656, the NSWO NF 132 may generate a UE authentication request message that includes the EAP response and AKA' challenge and send the UE authentication request message to the AUSF 136.

At 660, the AUSF 136 may verify the response. In particular, the AUSF 136 may determine whether the received response (RES) matches the expected response (XRES). If so, the AUSF 136 may derive the required MSK from the CK' and the IK' based on the NSWO indicator.

Assuming the response was successfully verified at 660, the procedure may include, at 664, the AUSF 136 transmitting a UE authentication response message that includes and EAP success indication and a master key (for example, the MSK).

At 668, the NSWO NF 132 may transmit the SWa protocol message to the WLAN AP with the EAP success and master key.

At 672, the WLAN AP 128 may transmit the EAP success message to the UE 104.

At 676, the UE 104 and the WLAN AP 128 may derive the WLAN keys from the PMK key and use the keys to perform a 4-way handshake to establish a secure association at 680.

At 684, the UE 104 and the WLAN AP 128 may exchange a local IP configuration. At this point, the UE 104 may successfully offload data to the WLAN AP 128.

Figure 8:
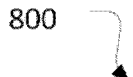
FIG. 8 illustrates an operational flow/algorithmic structure in accordance with some embodiments.
Figure 8:
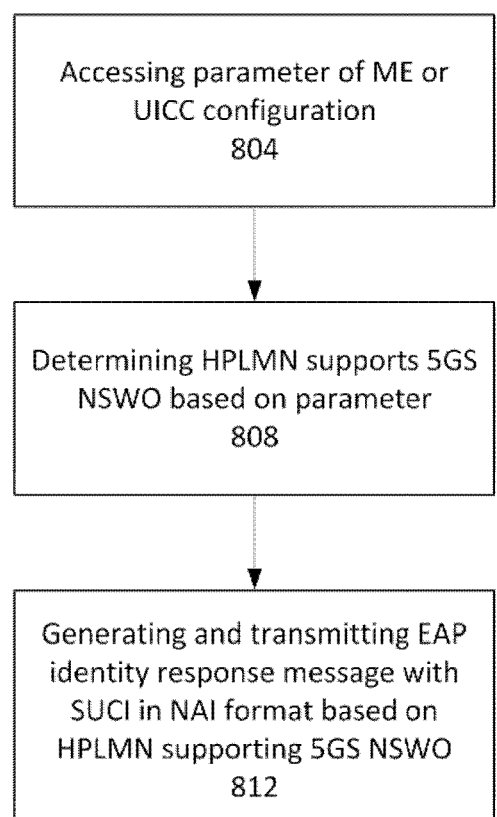

FIG. 8 illustrates an operation flow/algorithmic structure 800 in accordance with some embodiments. The operation flow/algorithmic structure 800 may be performed by a UE such as, for example, UE 104 or UE 1100, or components thereof, for example, processing circuitry 1104.

The operation flow/algorithmic structure 800 may include, at 804, accessing a parameter of an ME or UICC configuration. In some embodiments, the parameter may be provided as part of an ME configuration in a NAS configuration MO. In other embodiments, the parameter may be provided as part of a file of a UICC configuration. The file may be an EF such as, for example, an EF_UST, an EF_5GSN3GPPLOCI, or an EF_5GSN3GPPNSC. Additionally/alternatively, the file may be a DF such as, for example, a DF_5GS.

The operation flow/algorithmic structure 800 may further include, at 808, determining HPLMN supports 5GS NSWO based on the parameter. In some embodiments, the UE may detect a first parameter of a UICC configuration that provides a first indication with respect to support of 5GS NSWO and a second parameter of an ME configuration that provides a second indication with respect to support of 5GS NSWO. In this situation, the UICC configuration may take precedence. For example, the UE may determine whether the HPLMN supports 5GS NSWO based on the first parameter of the UICC configuration.

The operation flow/algorithmic structure 800 may further include, at 812, generating and transmitting an EAP identity response message with a SUCI in NAI format based on the HPLMN supporting 5GS NSWO. In some embodiments, an ME may retrieve the SUCI from the UICC in an IMSI format and convert the SUCI to an NAI format before transmitting in the EAP identity response message. The EAP identity response message may be generated/transmitted in response to an EAP identity request message received from a WLAN AP.

FIG. 9 illustrates an operation flow/algorithmic structure 900 in accordance with some embodiments. The operation flow/algorithmic structure 900 may be performed by a UICC such as, for example, UICC 148, or components thereof.

The operation flow/algorithmic structure 900 may include, at 904, storing a file with a parameter to indicate the HPLMN supports 5GS NSWO. The file may be an EF such as, for example, an EF_UST, an EF_5GSN3GPPLOCI, or an EF_5GSN3GPPNSC. Additionally/alternatively, the file may be a DF such as, for example, a DF_5GS.

The operation flow/algorithmic structure 900 may include, at 908, receiving one or more requests. The requests may be received from an ME and may include a GET IDENTITY request for the SUCI and another request for the parameter. The other request may be a generic command that is used to read an EF. For example, the generic command may be a SELECT command, a READ RECORD command, or another command specified for a UICC terminal interface as described in clause 11 of TS 31.101 v16.2.0 (2021 Jun. 25). In another example, the command may be part of a USIM application toolkit that has a set of commands and procedures for use during 3GPP network operation phase as specified in 3GPP TS 31.111 v17.2.0 (2021 Dec. 16). These procedures may be, for example, a profile/data download procedure, a call control procedure, or a proximity services (ProSe) usage information reporting procedure.

The operation flow/algorithmic structure 900 may further include, at 912, transmitting the parameter and a SUCI based on the one or more requests. The parameter/SUCI may be provided to the requesting ME together or individually. In some embodiments, the SUCI may be provided to the ME in an IMSI format. In some other embodiments, when the UICC contains the SUCI in IMSI format, the GET IDENTITY command may cause the UICC to convert the SUCI into NAI format before providing it to the ME.

Figure 10:
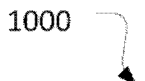
FIG. 10 illustrates another operational flow/algorithmic structure in accordance with some embodiments.
Figure 10:
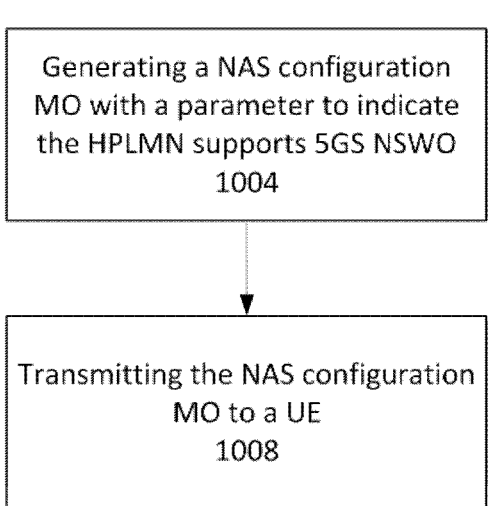

FIG. 10 illustrates an operation flow/algorithmic structure 1000 in accordance with some embodiments. The operation flow/algorithmic structure 1000 may be performed by an OMA DM such as, for example, network node 1200, or components thereof, for example, processing circuitry 1204.

The operation flow/algorithmic structure 1000 may include, at 1004, generating a NAS configuration MO with a parameter to indicate an HPLMN supports 5GS NSWO.

The operation flow/algorithmic structure 1000 may further include, at 1008, transmitting the NAS configuration MO to a UE. The generation and transmission of the NAS configuration amount may be done based on an OMA DM protocol and may take place at an initial configuration of the UE or at a reconfiguration of the UE.

Figure 11:
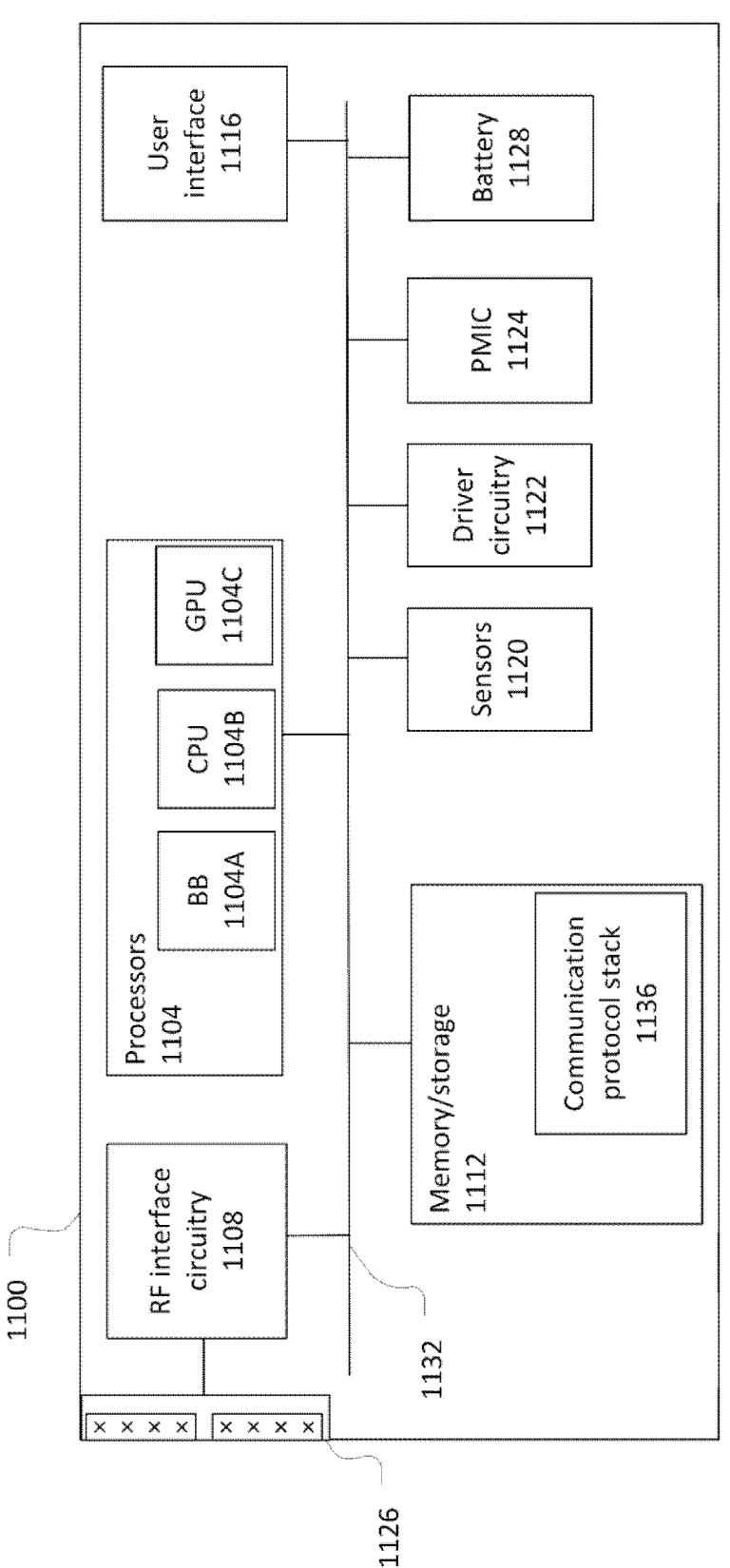
FIG. 11 illustrates a user equipment in accordance with some embodiments.

FIG. 11 illustrates a UE 1100 in accordance with some embodiments. The UE 1100 may be similar to and substantially interchangeable with UE 104 of FIG. 1.

The UE 1100 may be any mobile or non-mobile computing device, such as, for example, mobile phones, computers, tablets, XR devices, glasses, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 1100 may include processors 1104, RF interface circuitry 1108, memory/storage 1112, user interface 1116, sensors 1120, driver circuitry 1122, power management integrated circuit (PMIC) 1124, antenna structure 1126, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangement of the components shown may occur in other implementations.

The components of the UE 1100 may be coupled with various other components over one or more interconnects 1132, which may represent any type of interface, input/output, bus (local, system, or expansion), transmission line, trace, or optical connection that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some embodiments, the baseband processor circuitry 1104A may access a communication protocol stack 1136 in the memory/storage 1112 to communicate over a 3GPP compatible network. In general, the baseband processor circuitry 1104A may access the communication protocol stack 1136 to: perform user plane functions at a PHY layer, MAC layer, RLC sublayer, PDCP sublayer, SDAP sublayer, and upper layer; and perform control plane functions at a PHY layer, MAC layer. RLC sublayer, PDCP sublayer, RRC layer, and a NAS layer. In some embodiments, the PHY layer operations may additionally/alternatively be performed by the components of the RF interface circuitry 1108.

The baseband processor circuitry 1104A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 1112 may include one or more non-transitory, computer-readable media that includes instructions (for example, communication protocol stack 1136) that may be executed by one or more of the processors 1104 to cause the UE 1100 to perform various operations described herein. The memory/storage 1112 include any type of volatile or non-volatile memory that may be distributed throughout the UE 1100. In some embodiments, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1108 may include transceiver circuitry and radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 1126 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1126.

In various embodiments, the RF interface circuitry 1108 may be configured to transmit/receive signals in a manner compatible with NR access technologies.

The antenna 1126 may include antenna elements to convert electrical signals into radio waves to travel through the air and to convert received radio waves into electrical signals. The antenna elements may be arranged in one or more antenna panels. The antenna 1126 may have antenna panels that are omnidirectional, directional, or a combination thereof to enable beamforming and multiple input, multiple output communications. The antenna 1126 may include microstrip antennas, printed antennas fabricated on the surface of one or more printed circuit boards, patch antennas, or phased array antennas. The antenna 1126 may have one or more panels designed for specific frequency bands including bands in FR1 or FR2.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various I/O devices that may be present within, or connected to, the UE 1100. For example, the driver circuitry 1122 may include circuitry to facilitate coupling of a UICC (for example, UICC 148) to the UE 1100. For additional examples, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electromechanic components or control and allow access to the electro-mechanic components, a camera driver to control and allow access to an embedded image capture device, audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

In some embodiments, the PMIC 1124 may control, or otherwise be part of, various power saving mechanisms of the UE 1100 including DRX as discussed herein.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
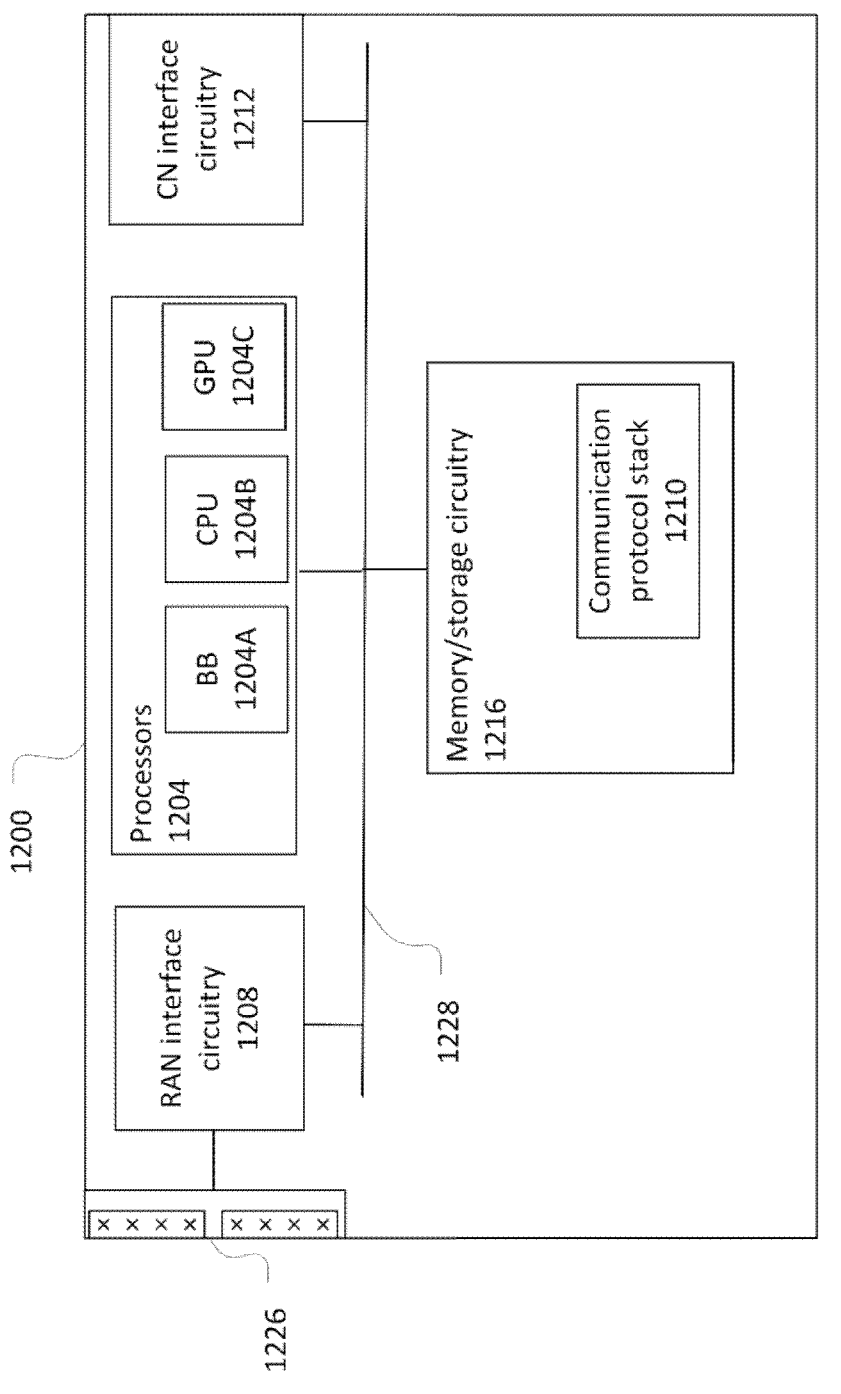
FIG. 12 illustrates a network node in accordance with some embodiments.

FIG. 12 illustrates a network node 1200 in accordance with some embodiments. The network node 1200 may be similar to and substantially interchangeable with an OMA DM or any other node of the 5GS or WLAN such as those illustrated in FIG. 1.

The network node 1200 may include processors 1204, RF interface circuitry 1208 (if implemented as an access node), core network (CN) interface circuitry 1212, memory/storage circuitry 1216, and antenna structure 1226.

The components of the network node 1200 may be coupled with various other components over one or more interconnects 1228.

The processors 1204, RF interface circuitry 1208, memory/storage circuitry 1216 (including communication protocol stack 1210), antenna structure 1226, and interconnects 1228 may be similar to like-named elements shown and described with respect to FIG. 11.

The CN interface circuitry 1212 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the base station 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

In some embodiments, the network node 1200 may be coupled with transmit receive points (TRPs) using the antenna structure 1226, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method comprising: accessing a parameter of a mobile equipment (ME) configuration; determining, based on the parameter, that a home public land mobile network (HPLMN) supports non-seamless wireless local area network offload (NSWO) in a 5th generation system (5GS); receiving, from a wireless local area network (WLAN) access point (AP), an extensible authentication protocol (EAP) identity request message; generating an EAP identity response message to include a subscription concealed identifier (SUCI) in a network access identifier (NAI) format; and transmitting the EAP identity response message to the WLAN AP.

Example 2 includes a method of example 1 or some other example herein, further comprising: retrieving, from a universal subscriber identity module (USIM), the SUCI; and adding a realm portion to the SUCI to convert the SUCI to the NAI format, wherein the realm portion is based on a mobile country code (MCC) and a mobile network code (MNC).

Example 3 includes the method of example 1 or some other example herein, further comprising: accessing the parameter in a non-access stratum (NAS) configuration measurement object (MO).

Example 4 includes the method of example 3 or some other example herein, wherein the parameter is a one-bit parameter.

Example 5 includes a method of example 1 or some other example herein, further comprising: receiving an EAP-authentication key agreement prime (AKA) challenge; and calculating an authentication response based on the EAP-AKA' challenge.

Example 6 includes a method comprising: accessing a parameter of a universal integrated circuit card (UTCC) configuration; determining, based on the parameter, that a home public land mobile network (HPLMN) supports non-seamless wireless local area network offload (NSWO) in a 5th generation system (5GS); receiving, from a wireless local area network (WLAN) access point (AP), an extensible authentication protocol (EAP) identity request message; generating an EAP identity response message to include a subscription concealed identifier (SUCI) in a network access identifier (NAI) format; and transmitting the EAP identity response message to the WLAN AP.

Example 7 includes the method of example 6 or some other example herein, wherein the parameter is a first parameter of the UICC configuration and the method further comprises: detecting a second parameter of an ME configuration; and determining the first parameter of the UICC configuration takes precedence over the second parameter of the ME configuration.

Example 8 includes method of example 7 or some other example herein, further comprising: retrieving, from a universal subscriber identity module (USIM), the SUCI; and adding a realm portion to the SUCI to convert the SUCI to the NAI format, wherein the realm portion is based on a mobile country code (MCC) and a mobile network code (MNC).

Example 9 includes the method of example 7 or some other example herein, wherein the parameter is a one-bit parameter.

Example 10 includes the method of example 7 or some other example herein, further comprising: accessing the parameter from a universal subscriber identity module service table (UST) elementary file (EF) that indicates which services are available for an ME to select.

Example 11 includes a method of example 7 or some other example herein further comprising: determining a 5GS dedicated file is present at an application DF (ADF) level based on the parameter being present in the UST EF.

Example 12 includes the method of example 6 or some other example herein, wherein the parameter is of a UICC configuration and the method further comprises: accessing the parameter from a 5GS non-Third Generation Partnership Project (3GPP) location information elementary file (EF).

Example 13 includes the method of example 6 or some other example herein, wherein the parameter is of a UICC configuration and the method further comprises: accessing the parameter from a 5GS non-Third Generation Partnership Project (3GPP) non-access stratum (NAS) security context elementary file (EF).

Example 14 includes method of example 6 or some other example herein, further comprising: receiving an EAP-authentication key agreement prime (AKA) challenge; and calculating an authentication response based on the EAP-AKA' challenge.

Example 15 includes a method comprising: storing, in memory of a universal integrated circuit card (UICC), a file with a parameter to indicate a home public land mobile network (HPLMN) supports non-seamless wireless local area network offload (NSWO) in a 5th generation system (5GS); receiving, by processing circuitry of the UICC, one or more requests from a mobile equipment (ME); and transmitting, by the processing circuitry, the parameter and a subscription concealed identifier (SUCI) to the ME.

Example 16 includes the method of example 15 or some other example herein, wherein the file is a universal subscriber identity module service table elementary file.

Example 17 includes a method of example 15 or some other example herein, wherein the file is a Fifth Generation System non-Third Generation Partnership Project location information elementary file.

Example 18 includes the method of example 15 or some other example herein, wherein the file is a Fifth Generation System non-Third Generation Partnership Project non-access stratum security context elementary file.

Example 19 includes the method of example 15 or some other example herein, wherein the SUCI is transmitted to the ME with an international mobile subscriber identity (IMSI) format.

Example 20 includes the method of example 15 or some other example herein, further comprising: converting the SUCI from an international mobile subscriber identity (IMSI) format to a network address identifier (NAI) format; and transmitting the SUCI to the ME in the NAT format.

Example 21 includes a method of example 20 or some other example herein, further comprising: receiving a GET IDENTITY command from the ME; and converting the SUCI from the IMSI format to the NAI format based on receiving the GET IDENTITY command.

Example 22 includes a method comprising: generating a non-access stratum (NAS) configuration measurement object (MO) to include a parameter to indicate a home public land mobile network (HPLMN) supports non-seamless wireless local area network offload (NSWO) in a 5th generation system (5GS); and transmitting the NAS configuration MO to a user equipment (UE).

Example 23 includes the method of example 22 or some other example herein, further comprising: transmitting the NAS configuration MO to the UE using an open mobile alliance device management protocol.

Example 24 may include an apparatus comprising means to perform one or more elements of a method described in or related to any of examples 1-23, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example 26 may include an apparatus comprising logic, modules, or circuitry to perform one or more elements of a method described in or related to any of examples 1-23, or any other method or process described herein.

Example 27 may include a method, technique, or process as described in or related to any of examples 1-23, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of examples 1-23, or portions thereof.

Example 29 may include a signal as described in or related to any of examples 1-23, or portions or parts thereof.

Example 30 may include a datagram, information element, packet, frame, segment, PDU, or message as described in or related to any of examples 1-23, or portions or parts thereof, or otherwise described in the present disclosure.

Example 31 may include a signal encoded with data as described in or related to any of examples 1-23, or portions or parts thereof, or otherwise described in the present disclosure.

Example 32 may include a signal encoded with a datagram, IE, packet, frame, segment, PDU, or message as described in or related to any of examples 1-23, or portions or parts thereof, or otherwise described in the present disclosure.

Example 33 may include an electromagnetic signal carrying computer-readable instructions, wherein execution of the computer-readable instructions by one or more processors is to cause the one or more processors to perform the method, techniques, or process as described in or related to any of examples 1-23, or portions thereof.

Example 34 may include a computer program comprising instructions, wherein execution of the program by a processing element is to cause the processing element to carry out the method, techniques, or process as described in or related to any of examples 1-23, or portions thereof.

Example 35 may include a signal in a wireless network as shown and described herein.

Example 36 may include a method of communicating in a wireless network as shown and described herein.

Example 37 may include a system for providing wireless communication as shown and described herein.

Example 38 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

accessing a parameter of a universal integrated circuit card (UICC) configuration;

determining, based on the parameter, that a home public land mobile network (HPLMN) supports non-seamless wireless local area network offload (NSWO) in a 5th generation system (5GS);

retrieving, from a universal subscriber identity module (USIM) on the UICC using a GET IDENTITY command, a subscription concealed identifier (SUCI) in a network access identifier (NAI) format, wherein the SUCI is converted from an international mobile subscriber identity (IMSI) format to the NAI format by the USIM;

receiving, from a wireless local area network (WLAN) access point (AP), an extensible authentication protocol (EAP) identity request message;

generating an EAP identity response message to include the SUCI in the NAI format; and outputting, for transmission, the EAP identity response message to the WLAN AP.

2. The method of claim 1, wherein the parameter is a first parameter of the UICC configuration and the method further comprises:

detecting a second parameter of an ME configuration; and determining the first parameter of the UICC configuration takes precedence over the second parameter of the ME configuration.

3. The method of claim 1, wherein the parameter is a one-bit parameter.

4. The method of claim 1, further comprising:

accessing the parameter from a USIM service table (UST) elementary file (EF) that indicates which services are available for an ME to select.

5. The method of claim 4, further comprising:

determining a 5GS dedicated file (DF) is present at an application DF (ADF) level based on the parameter being present in the UST EF.

6. The method of claim 1, further comprising:

accessing the parameter from a 5GS non-Third Generation Partnership Project (3GPP) location information EF.

7. The method of claim 1, further comprising:

accessing the parameter from a 5GS non 3GPP non-access stratum (NAS) security context EF.

8. The method of claim 1, further comprising:

receiving an EAP-authentication key agreement prime (AKA') challenge; and calculating an authentication response based on the EAP-AKA' challenge.

9. A universal integrated circuit card (UICC) comprising:

memory circuitry to store a file with a parameter to indicate a home public land mobile network (HPLMN) supports non-seamless wireless local area network off-load (NSWO) in a 5th generation system (5GS); and processing circuitry, coupled with the memory circuitry, to:

receive a GET IDENTITY command from a mobile equipment (ME); and calculate, based on the parameter and the GET IDENTITY command, a subscription concealed identifier (SUCI) in a network access identifier (NAI) format, wherein the calculation of the SUCI into NAI format includes conversion of the SUCI from an international mobile subscriber identity (IMSI) format to the NAI format; and output, for transmission to the ME, at least the calculated SUCI in the NAI format.

10. The UICC of claim 9, wherein the file is a USIM service table elementary file.

11. The UICC of claim 9, wherein the file is a Fifth Generation System non-Third Generation Partnership Project location information elementary file.

12. The UICC of claim 9, wherein the file is a Fifth Generation System non-Third Generation Partnership Project non-access stratum security context elementary file.

13. The UICC of claim 9, wherein the processing circuitry is further to:

convert the SUCI from the IMSI format to the NAI format based on receipt of the GET IDENTITY command.

* * * * *